May 19, 1936.  J. E. OLSON  2,041,143
HYDRATED ARTICLE AND METHOD OF MAKING
Filed Feb. 13, 1933   2 Sheets-Sheet 1
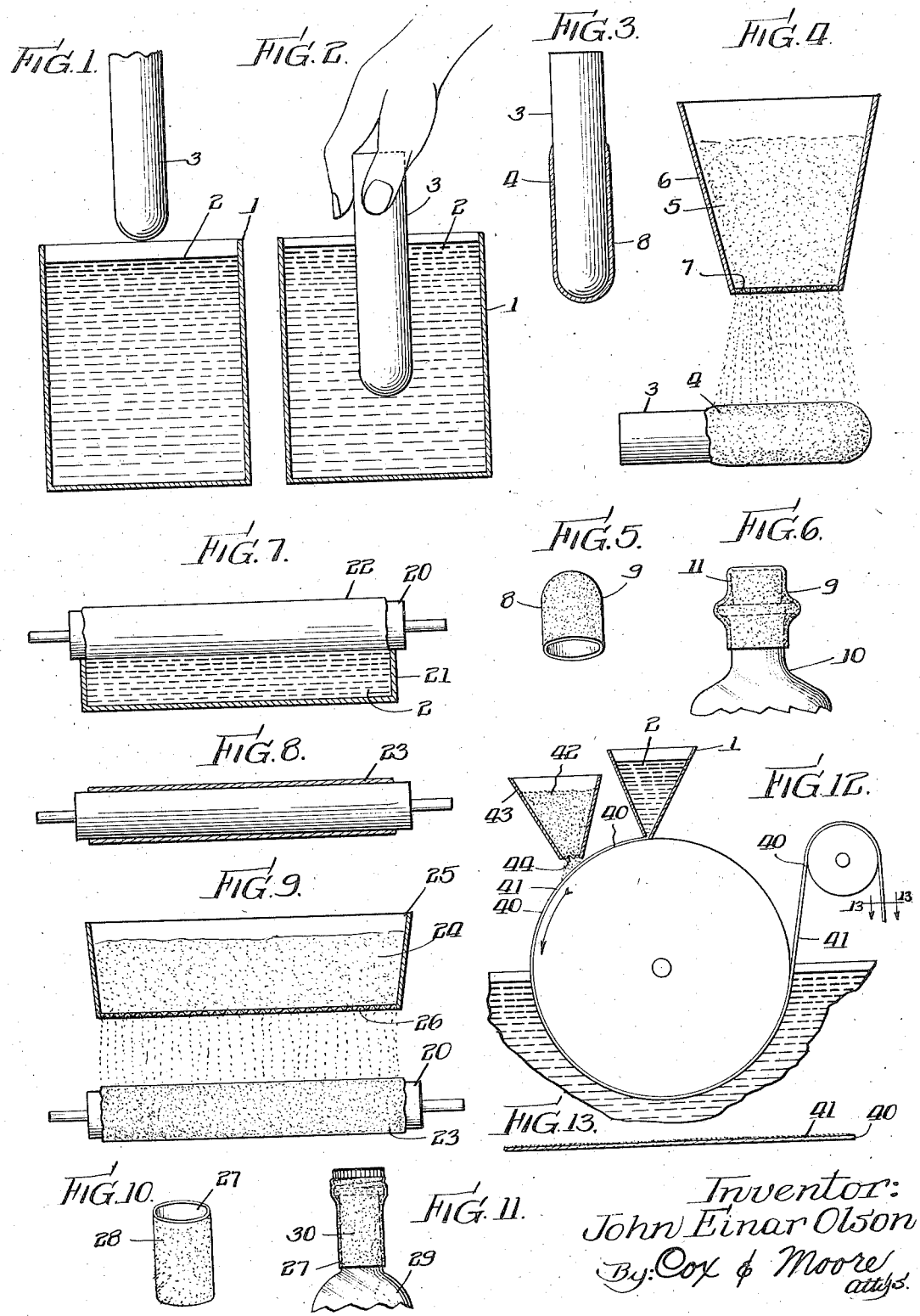
Inventor:
John Einar Olson
By: Cox & Moore
attys.

May 19, 1936.　　　　　J. E. OLSON　　　　　2,041,143
HYDRATED ARTICLE AND METHOD OF MAKING
Filed Feb. 13, 1933　　　2 Sheets-Sheet 2
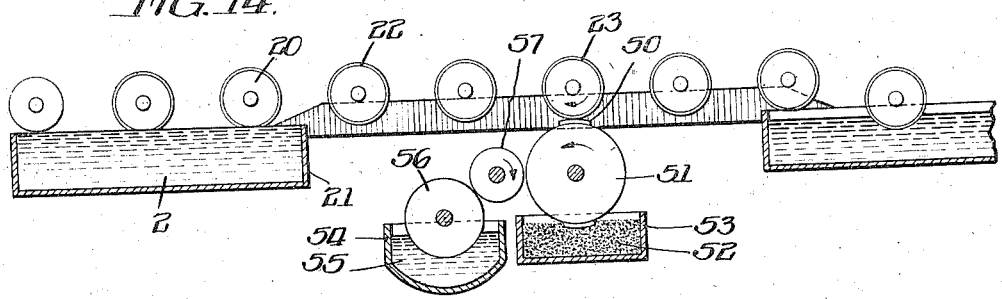
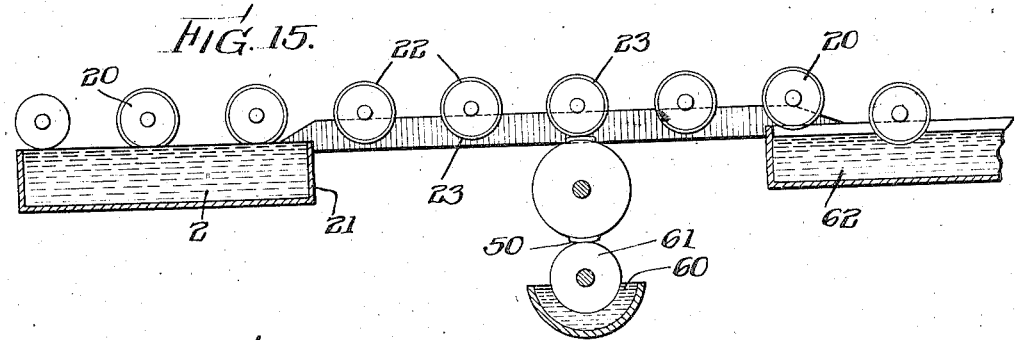
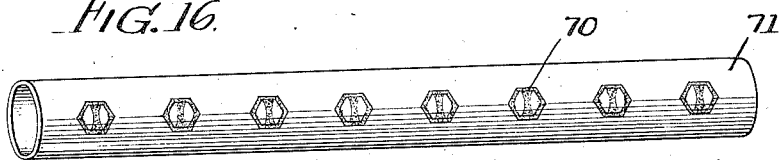
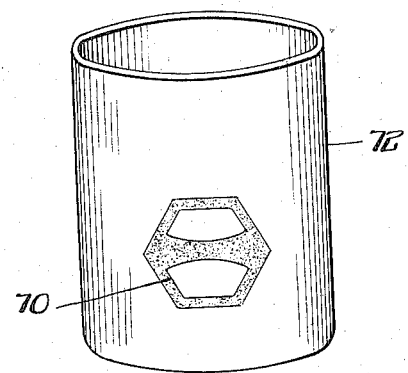
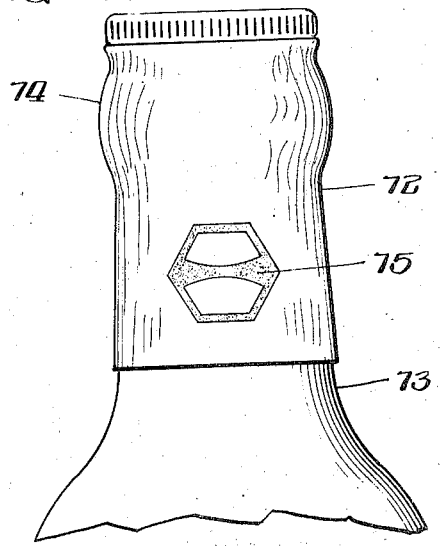
Inventor:
John Einar Olson
By Cox & Moore
attys.

Patented May 19, 1936

2,041,143

UNITED STATES PATENT OFFICE 2,041,143

HYDRATED ARTICLE AND METHOD OF MAKING

John Einar Olson, Madison, Wis., assignor to The Celon Company, Madison, Wis., a corporation of Wisconsin Application February 13, 1933, Serial No. 656,515

12 Claims. (Cl. 18—58)

This invention relates to films of gelatin, cellulose or cellulose derivatives with a surface coating of powdered or fibrous inert material and to the method of coating such films. More specifically, the invention relates to films made from a gelatinous substance such as jelly or gelatin and from cellulose or cellulose derivatives, and in the form of closure caps, tubular bands and seals for bottles, jars and the like, and in the form of sheets, and to the method of making such coated articles.

Films of gelatin or of cellulose or cellulose derivatives are well known and have a common and wide usage. Commonly these films are in the form of sheets, open end tubes and capsules. Some of these films have also been made opaque or made with metallic finish by dispersion of certain pigments throughout the entire cross section of the film. Such dispersion may be obtained by incorporating and dispersing the pigments in the original gelatinous or viscous substance before hardening or regenerating the substance into the proper film form.

These films of gelatin or of cellulose or cellulose derivatives are commonly used in a hydrated or in a dehydrated form. When formed as a capsule or tubular band they are commonly used in hydrated form as a secondary seal on a bottle, shrinking to conform to the shape of the bottle lip and neck as they lose their water of hydration by evaporation. As sheets, these films are usually in dehydrated form although even in sheet form they are sometimes used in hydrated form as coverings and advantage taken of the shrinking characteristic of the film as it loses its water of hydration by evaporation.

One of the commonly used inert pigments dispersed in such films is ground mica, this pigment being used to reproduce a metallic appearing film. The dispersion of ground mica not only reduces the tensile strength of the film, but also greatly reduces the contractibility or shrinkage of the film upon dehydration. Therefore, films in the form of caps or bands or sheets when used would not shrink sufficiently during dehydration to make a tight positive seal, and their use has been greatly limited. In those cases where the pigment was dispersed in the film it was found that the shrinkage or contractibility of the completed film from its hydrated to its dehydrated state amounted to only about ten or eleven percent, while the film, without any pigment added to it, had a shrinkage of twenty five percent or more.

The dispersion of inert pigments throughout the entire films by dispersing the pigment in the viscose therefore has many definite disadvantages which are definitely overcome by the present invention which opens up many new and varied uses to such films.

The primary object of the present invention is to provide an improved film which has the appearance of being wholly or partially opaque or made of metal and which has a high coefficient of contraction between its hydrated and dehydrated condition, and which has a comparative high tensile strength in both its hydrated and dehydrated form.

Another object is to provide a band, cap or other article which has all the ornamental characteristics of a metal or metal foil band, as well as the contracting and sealing characteristics of an ordinary gelatin or cellulose sealing body.

A further object is the provision of an article, such as a cap or band, or other form of film, made from gelatin or cellulose or cellulose derivative, and which has a surface thereof wholly or partially coated with a substance which is inert to the chemicals used in the process of manufacture.

A still further object of the invention is to provide an ornamental cap or band which has a coat containing a pigment which is inert to the chemicals used to give the band or cap a metallic or opaque appearance, the band or cap, when dehydrated, shrinking or contracting to fit firmly and snugly about the neck of a bottle or other container.

Still another object is the method of making an ornamental opaque or metallic appearing sealing article, such as a band or cap, from a gelatinous substance, such as jelly or gelatin, or cellulose or cellulose derivative, and applying to a surface of the article, during the making thereof, a material inert to chemical action of the substance used prior to the hardening, coagulation or regeneration of the substance.

Still another object of the invention is to print or otherwise apply a coating to the substance while it is in the form of a film of viscous material on the mold by contacting a surface of the film with a suitable die coated with an inert pigment. The pigment coating or marking may be applied in any suitable manner while the film is passing from one position to another. If printing is employed a die may be first coated with an adhesive and then contacted with the pigment so that the pigment will be impressed or placed upon the film. The printing, applying or marking operation may be carried out with various inert pigments, such as titanium oxide or ground mica, to make the printing, marking or striping appear white or metallic as desired.

Still another object of the invention is to provide a dehydrated film of gelatin or cellulose or cellulose derivative wholly or partially coated on one side with an inert coating of pigment or fibrous material whereby the film can be made to imitate, in appearance, metal, velvet, or chamois and, on its reverse side, to imitate leather, thus opening up new and varied uses to such films.

Numerous other objects and advantages will be apparent throughout the progress of the following specification.

The accompanying drawings illustrate various means in which the desideratum of the invention may be attained, and the views are as follows:

Fig. 1 is a detail sectional view showing a mold in which one form of the article may be made, prior to the dipping operation.

Fig. 2 is a detail sectional view showing the mold immersed in the substance.

Fig. 3 is a detail sectional view showing the mold having an exterior coating of the substance applied thereto.

Fig. 4 is a detail sectional view showing one form in which the substance may be provided with an exterior coating of a material inert to the chemical action of the substance to give the completed article a metallic appearance.

Fig. 5 is a detail perspective view of a completed cap made in accordance with the invention.

Fig. 6 is a detail elevation of a bottle having the cap arranged thereon, the cap being in its dehydrated form.

Fig. 7 is a detail sectional view of a roller mold showing the manner in which the substance may be applied thereto by being rolled over the surface of the substance to provide a film over the roller mold.

Fig. 8 is a detail sectional view of roller mold having a film of the substance applied thereto.

Fig. 9 is a detail sectional view showing the manner in which the inert material may be applied to the outer surface of the substance.

Fig. 10 is a detail perspective view of a band or tube made in accordance with the invention.

Fig. 11 is a detail perspective view of the tube or band applied to the neck of a bottle after the tube or band is dehydrated.

Fig. 12 is a detail sectional view showing the manner in which a sheet made from the substance may be coated with a material or substance to give the surface of the sheet a metallic appearance.

Fig. 13 is a detail sectional view through the completed sheet on the line 13—13 of Fig. 12.

Fig. 14 is a diagrammatic view showing the manner in which the film substance on the roller may be printed or marked during the manufacture of the articles.

Fig. 15 is a diagrammatic view showing a modified arrangement for printing or marking on the substance.

Fig. 16 is a detail perspective view of the regenerated film in tube form prior to being cut into bands.

Fig. 17 is a detail perspective view of a completed hydrated band.

Fig. 18 is a detail perspective view of a bottle showing the band in position thereon after the band is dehydrated.

One form of practicing the invention is shown in the drawings, particularly in Figs. 1 to 6 thereof, wherein 1 designates a suitable container or receptacle having a suitable amount of substance 2. The substance 2 may be cellulose solution or a solution of a cellulose derivative, such as viscose, or it may be jelly, gelatin or any known derivatives or equivalents thereof. A mold, such as a porcelain tube 3, is adapted to be dipped or immersed a predetermined distance into the substance 2 to provide a film 4 about the exterior surface of the mold as shown in Fig. 3. The making or forming operation may be done continuously by any suitable apparatus desired, or it may be done with apparatus of the type shown and disclosed in the copending application, Serial No. 685,579, filed August 17, 1933. Immediately after the film is formed on the tube, the film is sprayed with material, such as mica 5, which is carried by a suitable hopper 6. The hopper 6 may be provided with a mesh bottom 7 and agitated sufficiently to shake or dust a suitable amount of the mica about the outer surface of the film 4, it being understood that the mold is suitably manipulated or operated so that an even amount of the material 5 will be evenly spread about the exterior surface of the film. As soon as the film is coated with the mica, it is coagulated or regenerated in a well known manner. If the substance used is viscose, the viscose is passed immediately through a series of chemical baths to coagulate and regenerate the film of viscose on the mold. The manner in which viscose is passed through the chemical baths and the chemicals in the baths are well known in this art and, therefore, need not here be explained.

If, however, jelly, gelatin or any of the known derivatives or equivalents are used, the coated film on the mold is temperature treated or cured to coagulate or "jell" the substance to the proper degree. This latter method of treating or curing the substance is also well known in the art and, therefore, no further reference thereof need be made.

After the substance on the mold has been suitably treated and cured, the end 8 of the closed tube is severed from the remaining portion of the tube to provide a closure or cap 9.

The cellulose or gelatin cap in its hydrated form is slipped over the end of a bottle 10 and provides a seal and closure for the bottle after the cap is dehydrated. Dehydration may take place by any well known means or by permitting the moisture to evaporate into the atmosphere. When the caps are made from jelly, gelatin or any jelly equivalent or derivative, the curing operation may include dehydration so that the finished cap is relatively hard, dry and stiff. In order to apply this latter type of cap it is necessary to immerse the cap in liquid, such as water, to permit the cap to swell and become pliable. When swollen and pliable, the cap is applied over the bottle in the same manner in which the cellulose cap is applied. After dehydration, the jelly cap, like the cellulose cap, will shrink and contract and seal the closure 11 to the bottle in the usual conventional manner.

Sealing bands, that is, open end tubes, have certain advantages over the cap construction in that the top of the bottle closure or cork may be left uncovered and, therefore, not obstruct from view the manufacturer's name or trade-mark which may be stamped or printed on the top of the closure. Furthermore, the bands add greater ornamental appearance to the bottle or jar, particularly when the bands are made to simulate metal. The bands or tubes are also less expensive to manufacture due to the omission of the closed end, while the sealing characteristics of the band are practically equivalent to the sealing characteristics of a cap. If desired, the bands may be made in accordance with the disclosure made in Figs. 7 to 11 wherein rollers 20 roll over receptacles 21 which contain the substance 2. The rollers are positioned relative to the highest stratum of liquid in the containers so that when the rollers 20 roll over the receptacles 21, a film 22 of the substance 2 will adhere to the roller molds and form a film 23 of the substance on the molds. The substance, as formerly mentioned, is viscous and has adhesive qualities so that during the continued rolling movement of the rollers, a pigment, such as mica, may be applied to the exterior surface of the film 23 as it continues to roll to curing or treating position. The pigment may be powdered mica 24, Fig. 9, contained in a hopper 25 and sifted through a screen bottom 26 onto the film 23. The method of applying the pigment to the exterior surface of the film and one form of apparatus for making the tubes is clearly described and claimed in a copending application, Serial No. 685,578, filed August 17, 1933. After the regenerating or curing operation of the film on the mold to coagulate or congeal the substance, the film will be slipped over the end of the mold or roller 20 and then cut to the desired lengths to provide tubes or bands 27 which have metallic appearing exteriorly coated surfaces 28. The bands 27, whether they be cellulose or jelly, are placed over the end of a bottle 29 in their hydrated state. When dehydrated, the bands or tubes 27 will shrink and form a seal 30, Fig. 11.

The method is also applicable for coating a continuous sheet made from the substance as shown in Figs. 12 and 13. The sheet 40, while still in its adhesive or unregenerated state, has a surface coating 41 of a pigment, such as mica, to give the sheet the metallic surface. The sheet 40 has an opaque or pigment 42 dusted thereon while the substance is still in its adhesive state. The pigment may be contained in a hopper 43 which has a screened bottom 44. The hopper may be agitated sufficiently to insure the proper amount of pigment being applied to a surface of the sheet so that the sheet will be completely coated. The adhesive characteristic of the substance acts as a binder, and when the sheet is cured or regenerated, causes the pigment to become fixed to the surface of the sheet.

It is to be understood that only a part of the band need be pigmentized or rendered opaque. One form in which this may be done is by applying the pigment to only a part of the film so that one part, or certain parts, of the finished article will be pigmentized or rendered opaque, while the rest of the article will be left transparent. Or, the coating or opaquing of the substance can be done in alternate steps so that the final product will have a part of the surface coated with one material and another part of the surface coated with another material. Also, it is possible to print letters or designs or both on the substance by using either a pigmentized material or some material, such as titanium oxide, to render the substance opaque. In Figs. 14 to 18 inclusive there is shown means for carrying out a printing operation on the viscous film. The rolls having the tubular film 23 thereon may be printed by dies 50 mounted on a roller 51 which picks up pigment 52, such as mica, in a container 53. Adjacent to the container 53 there is a pot 54 containing an adhesive 55. The adhesive adheres to a roller 56 and applies the adhesive on a wiping roller 57. The wiping roller coats the dies 50 with the material. During the revoluble movement of the roller 51, the die is first coated with the adhesive and then coated with the mica. The adhesive used has less adhesive characteristics than the substance 2 so that when the die comes in contact with the film 23, the substance will remove the mica from the die.

Instead of using mica, other pigments 60, such as titanium oxide, may be used, Fig. 15. The roller 61 deposits titanium oxide or other chemical substance on the dies 50 and when the dies come in contact with the film 23, the chemical will be deposited on the film. When the film is treated, such as by passing into a coagulating bath 62, the titanium oxide will render that portion of the film opaque, leaving the rest of the film in its natural or transparent state. The dies may carry any indicia whatever, such as indicated at 70, Fig. 16. The indicia may comprise numerals, marks, lines or any suitable symbols desired. The method just described is also applicable where bands are made in the manner shown in the copending case, Serial No. 656,516, filed January 13, 1933. The rollers 20 may be relatively long to provide a long tube 71 of the substance, Fig. 16. When the tube is regenerated, it is cut in suitable lengths to provide bands 72, Fig. 17, which, when applied over a bottle 73, Fig. 18, provide a sealing element 74 having indicia, or symbols 75 applied or printed thereon.

The articles, regardless of the type or the material used or the method employed in making the articles, may be dyed any color desired. The dyeing operation of articles of this type is well known and, therefore, need not be further described.

The invention provides a highly ornamental appearing sealing aritcle having considerable shrinking or contractible capabilities. Thus, when the article is applied on a bottle or other container, the container closure is sealed airtight and the bottle or other container is given a highly ornamental appearance. The bands seal the contents of the container, prevent evaporation and tampering, prevent spillage and leakage, keep the outlet of the container sterile and prevent contamination as well as ornamentaing the container and protecting the lip or outlet of the container. The bands, caps or sheets also may be partly coated leaving a part of the article in its natural transparent state, or the transparent bands may have indicia or symbols of an opaque or metallic appearance depending on the substance used, or the completed article may be completely coated with different kinds of pigment. The hydrated bands 72 may also be dyed, if desired.

Changes may be made in the form, construction and arrangement of the articles, and the method of forming an opaque coating on a surface with a pigment may be varied, and various kinds of pigments may be substituted other than those herein set forth without departing from the spirit of the invention or sacrificing any of its advantages, and the right is hereby reserved to make all such changes as fairly fall within the scope of the appended claims.

The invention is hereby claimed as follows:

1. The method of making a regenerated cellulose hydrated article, such as a band, cap or the like, which consists in applying a coating to a part of a surface of viscose material, from which the article is made prior to regeneration of the viscose, said coating including an inert pigment to render the coated parts of the article opaque and leaving part of the article clear, whereby the shrinkage properties of the regenerated viscose are left substantially normal.

2. The method of making a regenerated cellulose hydrated article, such as a band, cap or the like, to provide an article with a clear portion and a contrasting opaque portion which consists in applying a pigmentized coating, such as mica, to certain parts of a surface of the viscose from which the article is made prior to the regeneration of the viscose, thus maintaining shrinkage properties to the regenerated viscose which are substantially normal.

3. The method of making an ornamental regenerated hydrated article, such as a band, cap or the like, which consists in forming a design from an inert pigment, such as mica, and applying it to the surface of the viscose material from which the article is made and then regenerating the viscose with the design upon the surface whereby the shrinkage properties of the regenerated viscose is not materially diminished.

4. The method of making a regenerated cellulose hydrated article such as a band, or the like, which consists in applying a preformed portion of an inert pigment, such as mica or titanium oxide, to the surface of viscose material from which the article is made and then regenerating the viscose whereby the shrinkage property of the regenerated viscose is not materially diminished.

5. A cellulose body, and a pigment coating including powdered mica applied to the surface of said body prior to the regeneration thereof whereby to present a coating, the pigments of which are partially embedded within the body to a degree which will enhance the adhesion of the pigments to the body and maintain the required shrinkage capabilities of the body when dehydrated.

6. A cellulose body, and a metallic appearing pigment coating applied to the surface of said body prior to the regeneration thereof whereby to present a coating, the pigments of which are partially embedded within the body to a degree which will enhance the adhesion of the pigments to the body and maintain the required shrinkage capabilities of the body when dehydrated.

7. A cellulose body in the form of a cap, and a pigment coating applied to the external surface of said cap prior to the regeneration thereof whereby to present a coating, the pigments of which are partially embedded within the body to a degree which will enhance the adhesion of the pigments to the body and maintain the required shrinkage capabilities thereof when dehydrated.

8. The method of making a cellulose body from viscose which consists in applying a metallic appearing pigment coating to the viscose and then coagulating the coated viscose, the coating being secured to the viscose by regeneration or coagulation of the viscose.

9. The method of making a cellulose body from viscose which consists in applying a pigment coating to the viscose and then coagulating the viscose in a coagulating bath, the coating being secured to the viscose by the adhesive characteristics of the material and held thereon by coagulation of the viscose.

10. The method of making a cellulose body from viscose which consists in dusting a pigment coating on the viscose, then regenerating the viscose, the pigment being applied prior to regeneration whereby the pigment will become secured to the body.

11. The method of making a cellulose article which consists in making a body of viscose, then applying a pigment to the viscose body, and finally passing the viscose body with the pigment thereon through a coagulating bath.

12. A regenerated cellulose article, such as a band, cap or the like, comprising a clear transparent body made of regenerated viscose, a contrasting opaque portion applied to the body and secured thereto by the regeneration of the viscose, said opaque portion containing an inert pigment, whereby an article is provided of substantially normal shrinking characteristics.

JOHN EINAR OLSON.